United States Patent [19]

Conard

[11] 3,855,194

[45] Dec. 17, 1974

[54] CURING RESINOUS HOMOPOLYMERS AND COPOLYMERS OF BUTADIENE OF HIGH 1,2-CONFIGURATION

[75] Inventor: Wendell Reed Conard, Kent, Ohio

[73] Assignee: The Firestone Tire and Rubber Company, Akron, Ohio

[22] Filed: Oct. 16, 1973

[21] Appl. No.: 406,792

[52] U.S. Cl. ........ 260/94.7 A, 117/72, 117/126 GB, 117/132 CB, 117/138.8 UA, 260/42.37, 260/42.44, 260/66, 260/85.1, 260/880 R, 260/889, 260/DIG. 28
[51] Int. Cl. ... C08d 5/02, C08d 11/04, C08d 13/28
[58] Field of Search.............. 260/66, 94.7 A, 880 R

[56] References Cited
UNITED STATES PATENTS

| | | | |
|---|---|---|---|
| 3,384,629 | 5/1968 | Strobel.......................... | 260/94.7 A |
| 3,594,361 | 7/1971 | Parris et al...................... | 260/94.7 A |
| 3,635,933 | 1/1972 | Schaffhauser et al. ........ | 260/94.7 A |
| 3,635,934 | 1/1972 | Schaffhauser et al. ........ | 260/94.7 A |
| 3,786,087 | 1/1974 | Conard et al.................. | 260/94.7 A |

*Primary Examiner*—Morton Foelak

[57] ABSTRACT

A polymer of the class consisting of a homopolymer of butadiene or a copolymer of butadiene and styrene or the like, at least 40% of which polymer is butadiene and at least 80% of the repeating butadiene units are of the 1,2-configuration, is cured in two stages with peroxides using cobalt and iron naphthenates as accelerators, and preferably with pentanedione as an activator.

1 Claim, No Drawings

CURING RESINOUS HOMOPOLYMERS AND COPOLYMERS OF BUTADIENE OF HIGH 1,2-CONFIGURATION

BACKGROUND OF INVENTION

The polymeric material of this invention is cured with peroxides, usually in two stages. The first stage is a low-temperature cure utilizing methylethyl ketone (MEK) peroxide or other peroxide used in lower-temperature cures, cobalt naphthenate, iron naphthenate, and acetylacetone (pentanedione) or the like; if a second stage is utilized, a peroxide required for a higher-temperature cure is employed.

The curing of polyesters with cobalt naphthenate and iron naphthenate, together with pentanedione, is known in the art and is disclosed in "Accelerators for Peroxide Curing of Polyesters" by Brinkman et al. on pages 167–172 of Modern Plastics for October, 1968. Manganese naphthenate which is commonly used with polyesters actually slows the cure of the resin to which this invention relates. Also, dimethyl aniline used as an accelerator in the cited article slows the cure of the resin employed in the process of this invention. The cobalt and iron naphthenates are used at much lower levels than disclosed in the article.

THE CURE

The polymer used in this invention is a resinous homopolymer of butadiene or a copolymer of butadiene and styrene or an alkyl derivative thereof containing 1 to 4 carbon atoms, e.g. alpha-methyl styrene, t-butyl styrene etc. The polymer contains at least 40% of butadiene, and at least 80% of the butadiene repeating units are of the 1,2-configuration.

The polymer is peroxide-cured preferably in two stages. The first stage is carried out at about room temperature, any temperature between 50° and 150° F. being satisfactory and temperatures between 65° and 95° F. being preferred. The second stage of the cure, if one is employed, is carried out at a higher temperature, e.g. 250° to 400° F.

A one-stage cure produces a product which is moderately tough and rubbery, and is advantageously employed for the product of flexible circuit boards, etc. The two-stage cure has particular value in the curing of films or other products of large surface area. In the first stage, the product gels, partially due to the exposure of the large surface area to the air. At the end of 2 to 5 hours the products have gelled to the point at which the surfaces are no longer sticky, and the products have improved strength.

In the first stage, the cure is accomplished with a curing agent which decomposes at the temperature of the cure which is not over about 150° F., and MEK peroxide is preferred. Other peroxides including bis(4-t-butyl cyclohexyl)-peroxydicarbonate, lauroyl peroxide, benzoyl peroxides, etc. may be used. The cure is effected without appreciable gas evolution because there is no substantial decomposition of the polymeric material during the cure. From substantially 0.2 to 5.0 parts of the lower-temperature-curing peroxide may be used.

The activators used in the controlled curing to which this invention relates are iron and cobalt naphthenates. Lead naphthenate may be used instead of iron naphthenate. Other naphthenates disclosed in the above article, for use with cobalt naphthenate, are not as satisfactory as iron naphthenate. The ratio of the amount of the cobalt naphthenate to the iron naphthenate (or the amount of cobalt to the iron in the naphthenates) is about 3–5/1. Generally, the amount of cobalt naphthenate used (based on the weight of the cobalt in the cobalt naphthenate) will be about 0.2 to 2.0 parts per 100 parts of the lower-temperature-curing peroxide used in the first stage of the cure.

Cobalt naphthenate is recognized as an accelerator for the peroxide cure of the polymer. However, in first-stage curing of a sheet or other product of large surface area with only cobalt naphthenate, the surface is cured to a greater extent than the interior. By using iron naphthenate with the cobalt naphthenate, the product is uniformly cured throughout.

The first stage of the cure utilizes acetylacetone (pentanedione) as an accelerator. Substantially 10 to 30 parts of the accelerator, and preferably about 20 parts, are used per 100 parts of the low-temperature-curing peroxide.

The second stage of the cure is effected by a peroxide which is activated only at a higher temperature. At the end of this stage, the product is stiffer and harder than can be satisfactorily obtained with the peroxides used in the first stage.

The peroxide activated in the second stage of the cure is a high-temperature-curing peroxide such as t-butyl perbenzoate, dicumyl peroxide, cumene hydroperoxide, etc.

The polybutadiene or polybutadiene/styrene resin is usually dissolved in a styrene-type monomer, in compounding such monomer has proved desirable, although not necessary.

In the first part of Example 1 (which follows), the only peroxide used was one which cures at a relatively low temperature. The other examples include a further or second-stage cure with a second peroxide, one which is activated at a higher temperature. In the examples, the amounts of cobalt and iron naphthenates refer to the amounts of the metals present.

EXAMPLE 1

Evaluation of Different Metals to Activate the Peroxides

We evaluated naphthenates of the following metals as activators for MEK peroxide in resinous, high 1,2-poly-butadiene of this invention as a solution of 60% in styrene or t-butyl styrene in glass-mat laminates.

Cobalt, iron, copper, manganese and lead were evaluated at levels of from 0.1 to 0.4 parts per 100 parts of the polymer solution. Iron produced the stiffest product but had a slightly tacky surface. A combination 0.1 parts of cobalt and 0.1 part of iron per 100 parts of resin produced the best overall product. Manganese was tested but produced no acceleration of the cure.

Levels of 0.1 part of cobalt and 0.1 part of iron produced objectionable color in the stocks and subsequent experiments established that the following levels were the most desirable from a standpoint of low color, rapid drying to tack-free and subsequent cure to harder products if desired.

| | |
|---|---|
| Polybutadiene or Butadiene/Styrene Resin | 90 to 50 parts |
| Styrene or t-butyl styrene | 10 to 50 parts |
| MEK peroxide | 2 to 4 parts |
| Dicumyl peroxide | 1 to 4 parts |

| | |
|---|---|
| Cobalt | 0.025 to 0.1 parts |
| Iron | 0.006 to 0.02 parts |

The cure or drying of the products was accelerated by addition of about 1 part of pentanedione per 100 parts of polymer solution. Other accelerators commonly used in polyesters such as acetoacetanilide, dimethyl aniline, and ammonium nitrosophenylhydroxylamine were poorer and the last two mentioned accelerators slowed the drying and cure.

EXAMPLE 2

Optimum Levels of Cobalt, Iron, and Pentanedione in Coating Compound

A compound which could be used for coating concrete, etc. was prepared as follows:

| | |
|---|---|
| Polybutadiene Resin | 70 parts |
| t-Butylstyrene | 30 |
| MEK Peroxide | 4 |
| Dicumyl Peroxide | 4 |
| Silica | 300 |
| Calcium stearate | 1.5 |
| Titanium dioxide | 1.5 |
| Silane (a) | 1.5 |
| Cobalt naphthenate | Varied |
| Iron naphthenate | Varied |
| Pentanedione | Varied |
| Methylethyl ketoxime | Varied |

(a) Gamma-methacryloxypropyltrimethoxy silane

Cobalt and iron levels of 0.012, 0.024 and 0.048 parts per hundred of polymer solution were evaluated with 0, 1.2 and 2.4 parts pentanedione. A level of 0.024 cobalt + 0.024 iron + 1.2 pentanedione produced the hardest film after 1 and 7 days (best of the series). The addition of the pentanedione in general, reduced the time necessary for gelling by one half. The samples which contained no pentanedione produced non-sticky and otherwise satisfactory films after extended curing. The ketoxime which has sometimes been used as an anti-skinning agent in drying oils softened all samples containing the product.

EXAMPLE 3

Gel Coat Formulation

Fiberglass sinks, bath tubs, shower stalls, and such products require a top coat to hide the glass strands for better appearance and also to prevent roughing up the glass strands by scouring. The following composition produced good coatings which gelled at room temperature and were then baked at 150° C. (a second stage of curing) to a satisfactory hardness.

| | |
|---|---|
| Polybutadiene Resin | 80 parts |
| t-Butyl styrene | 20 |
| MEK Peroxide | 3 |
| Dicumyl Peroxide | 3 |
| Powdered polyethylene | 10 |
| Silica (325 mesh) | 15 |
| Titanium dioxide | 25 |
| Colloidal silica | 2 |
| Ultramarine Blue Paste | 0.1 |
| Vinyltriacetoxy silane | 0.5 |
| Cobalt | 0.0125 |
| Iron | 0.0032 |
| Pentanedione | 1 |

The addition of small amounts of antioxidont such as dibutyl p-cresol (0.1 to 0.3 phr.) helped maintain good color in coatings exposed to light. These coatings were also satisfactory on metal, some plastics, etc.

Although these examples show the cure of styrene-type solutions of the resin, it is possible to gel the viscons resins with dicumyl peroxide using cobalt naphthenate. However, these stocks required 4 days to reach moderate stiffness.

If a higher-temperature-curing peroxide is employed, 0.5 to 5 parts per 100 parts of resin will be satisfactory.

I claim:

1. The improvement in the two stage process of peroxide-curing a polymer of the class consisting of resinous homopolymers of butadiene and copolymers of butadiene and styrene, with and without solution in styrene-type monomers, said resin comprising at least 40% of butadiene and at least 80% of the repeating butadiene units being of the 1,2-configuration, which improvement comprises curing, in the first stage, with 0.2 to 5 parts per 100 parts of the resin of a lower-temperature-curing peroxide at 50° to 150° F. of a mixture of cobalt and iron naphthenates and 10 to 30 parts of pentanedione, using cobalt and iron naphthenates in the ratio of 3 to 50 parts by eight of cobalt naphthenate to 1 part of iron naphthenate, 0.2 to 2 parts by weight of cobalt being used per 100 parts of the peroxide and in the second stage, post-curing with a high-temperature curing peroxide at 250° to 400° F.

* * * * *